WEBSTER & LADD.
Bed Bottom.
No. 64,175.
Patented Aug. 28, 1867.
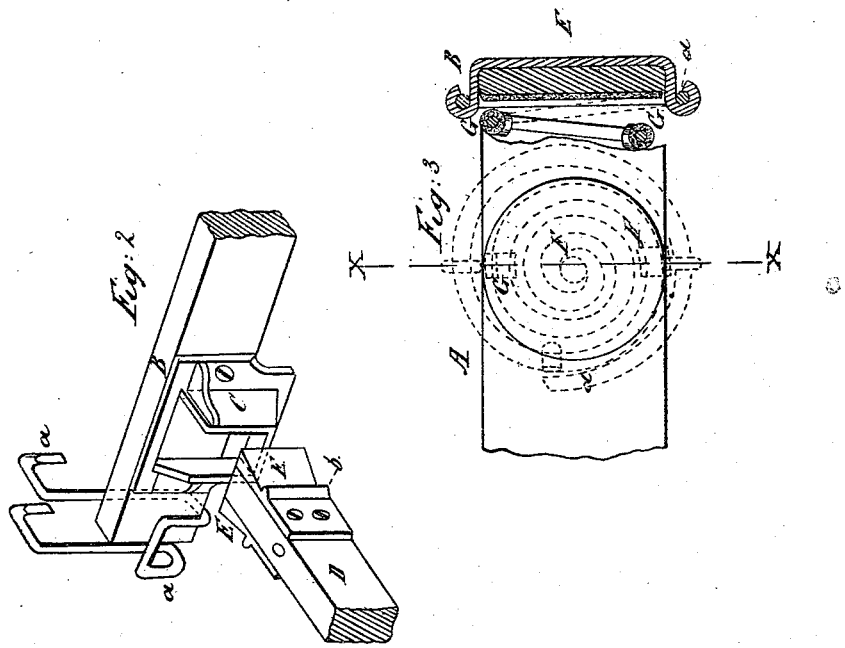
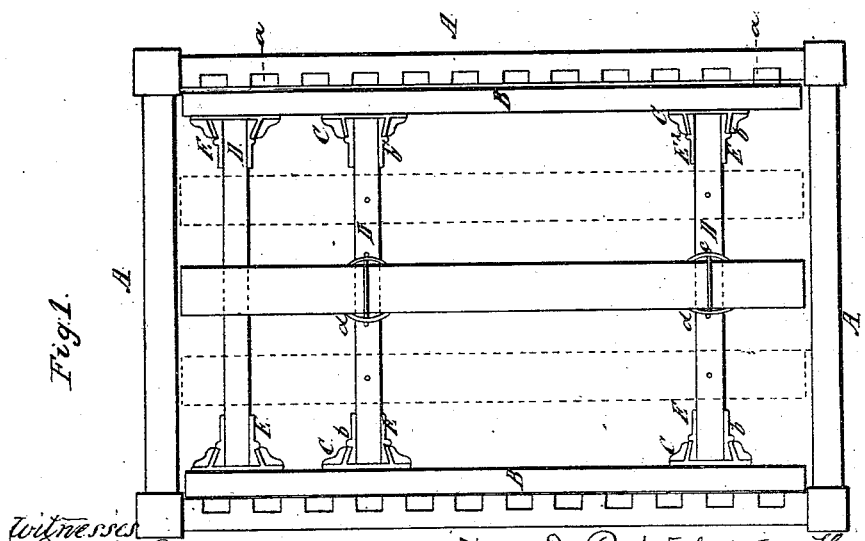

United States Patent Office.

DEXTER P. WEBSTER AND HERMON W. LADD, OF PHILADELPHIA, PENNSYLVANIA.

Letters Patent No. 64,175, dated April 23, 1867.

---

IMPROVED SPRING-BED BOTTOM.

---

The Schedule referred to in these Letters Patent and making part of the same.

---

TO ALL WHOM IT MAY CONCERN:

Be it known that we, DEXTER P. WEBSTER and HERMON W. LADD, of the city and county of Philadelphia, and State of Pennsylvania, have invented certain new and useful improvements in Spring-Bed Bottoms; and we do hereby declare the following to be a full, clear, and exact description of the nature thereof, sufficient to enable others skilled in the art to which it appertains to make and use the same, reference being had to the accompanying drawings, making part of this specification, in which—

Figure 1 is a top or plan view of our invention.

Figure 2 is a perspective view, showing the connecting parts of the frame and the pendent support.

Figure 3 is a top or plan view of a spring and protecting cushion.

Figure 4 is a transverse vertical section of the spring, in the line $x\ x$, fig. 3.

Our invention has for its object the production of a frame for supporting the spring slats, which can be readily taken apart and easily refitted without screws, nails, or like devices, and admitting of great portability, and are intended to be hung or suspended upon pendent hooks secured to the bedstead frame. It further consists in the application of flexible cushions on the coils, whereby all noise or jarring is prevented when the slats are depressed and the springs compressed; all as will be hereinafter more fully described.

A, fig. 1, represents the ordinary side and end-pieces of a bedstead, having pendants, $a$, on which the frame rests. These pendants consist of a wire first bent into U shape, then the two opposite ends turned into loops, pointing in opposite direction. The ends of the upper loop constituting the two ends of the wire have sharp cutting edges, so that they can be driven into the frame of the bedstead at suitable places. The lower loop receives and holds the pieces B of the slat frame. When the hooks are in position, the frame supporting the springs and slats is suspended within the bedstead frame at a height equal therewith. B are the two side-pieces of the frame, of ordinary construction, and of the length of the side-pieces of the bedstead. On their inner side, at regular intervals, there are secured dove-tail brackets, C, which are adapted to receive the dove-tailed ends of the cross-pieces D, which, when secured therein, retain the frame firmly in position without any other mode of securing or fastening. To the end of each cross-piece D, on both sides, there are secured plates E, having a bead or shoulder, $b$, on their faces at the middle, and from this shoulder the plates gradually increase in thickness, forming one side of a dove-tailed joint. This bead acts as a guide in introducing the ends of the cross-pieces into the brackets, and assists in forming a more perfect joint. The cross-pieces may have their ends cut of a corresponding form, but as the wood may warp, or in washing them become wet, and then not readily enter the brackets, we prefer the plates, for their cost is but little and their utility great. In putting the frame together the two side-pieces are set upright, and the ends of the cross-pieces fitted into the brackets and pressed downwards to their full extent, when all parts will be firmly held in position independently of any other mode of fastening. The cross-pieces are pierced to receive the ends of the springs $d$, which bear the slats. Only two cross-pieces are necessary, but we employ a third one near the end, which will be at the foot of the bed, so that if any one rests or sits thereon, the weight will be brought directly on this lower piece, and thus prevent the breaking or snapping of the slats. In taking the bed apart the slats and springs are first removed, then the cross and sidepieces separated, and thus all parts can be readily made in one bundle and in suitable condition for transportation. To the lower side of each slat, within the space surrounded by the upper or larger coil of the spring, we secure, by cementing or otherwise, a flexible pad, F. This pad may be made of rubber, felt, cloth, or other fabric, and is intended to prevent noise when the coils strike the slat, when the latter is depressed. To still further attain this object, we secure on the coils, above the one to which the wire clamp $c$ is attached, rubber cushions, G. These cushions consist of sections of tubes which can be slipped over the coils of the springs to their position, and are readily removed when desired. When the coils are compressed by the depression of the slats, the cushion on the first coil will strike the flexible pad F, the cushion of the next coil will likewise strike the pad, but its opposite side will strike the cushion of the first coil, and thus all noise will be deadened, and the coils and slats act entirely noiseless.

The simplicity of this device is apparent. The slats and springs can be readily cleaned, vermin can find no resting place, no noise is made, and the frame can be easily taken apart and put together again.

Having thus described our invention, what we claim as new, and desire to secure by Letters Patent, is—

1. The detachable frame herein described, the same consisting of the side-pieces B, with dove-tail brackets C, and the cross-pieces D, with dove-tail ends, constructed and operating substantially as and for the purpose specified.

2. The plates C constructed as described, in combination with the cross-pieces D, substantially as and for the purpose specified.

3. The removable sectional tubular cushions G, applied to the coils of the springs, substantially as described for the purpose specified.

4. The pendent hooks a, constructed as described, in combination with the bedstead frame A, supporting the slat-bearing frame, substantially as described for the purpose specified.

To the above specification of our invention we have signed our hands this 23d day of November, 1866.

DEXTER P. WEBSTER,
HERMON W. LADD

Witnesses:
WARREN W. PAGE, } for WEBSTER.
C. A. PETTIT,
AARON MIDDLETON, } for LADD.
A. TANNER,